US012795052B2

(12) United States Patent
Suda et al.

(10) Patent No.: US 12,795,052 B2
(45) Date of Patent: Nov. 10, 2026

(54) REMOTE OPERATOR TERMINAL, IMAGE DISPLAY METHOD, AND REMOTE OPERATION SYSTEM

(71) Applicant: TOYOTA JIDOSHA KABUSHIKI KAISHA, Toyota (JP)

(72) Inventors: Rio Suda, Toyota (JP); Kosuke Akatsuka, Mishima (JP); Takahiro Ito, Tama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/043,926

(22) Filed: Feb. 3, 2025

(65) Prior Publication Data

US 2025/0274568 A1 Aug. 28, 2025

(30) Foreign Application Priority Data

Feb. 28, 2024 (JP) ................................ 2024-028341

(51) Int. Cl.
*H04N 7/18* (2006.01)
*G06F 3/01* (2006.01)
*G06T 3/40* (2024.01)

(52) U.S. Cl.
CPC ............. *H04N 7/183* (2013.01); *G06F 3/013* (2013.01); *G06T 3/40* (2013.01)

(58) Field of Classification Search
CPC ............ B60W 2420/403; B60W 40/02; G05D 1/2247; G06F 3/013; G06F 3/14;
(Continued)

(56) References Cited

U.S. PATENT DOCUMENTS

2011/0066262 A1* 3/2011 Kelly ................ G05B 23/0267 703/17
2018/0270417 A1* 9/2018 Suitoh .................... H04N 25/61
(Continued)

FOREIGN PATENT DOCUMENTS

CN 108038416 A * 5/2018 ............ G06V 20/62
WO 2018155159 A1 8/2018

OTHER PUBLICATIONS

Kodai Matsubara and Manabu Omae, "Compensation of Camera Image Latency in Remotely Operated Vehicle using Projection Transformation," 19th ITS Symposium 2021,4-A-12, Dec. 2021.

*Primary Examiner* — Peet Dhillon
(74) *Attorney, Agent, or Firm* — Hunton Andrews Kurth LLP

(57) ABSTRACT

A remote operator terminal is used by a remote operator for a remote operation of a moving body. A first image is captured at a first timing by a camera mounted on the moving body from a first point of view. A second point of view is one at a second timing later than the first timing. A homography process converts the first image viewed from the first point of view into a second image viewed from the second point of view. The remote operator terminal acquires a plurality of second images by applying the homography process to a plurality of first images, respectively. The remote operator system displays the plurality of second images side-by-side on a display such that a priority second image corresponding to a gaze direction of the remote operator appears to be in front of the other second images.

5 Claims, 14 Drawing Sheets

(58) Field of Classification Search
CPC ................ G06T 3/40; G08G 1/096741; G08G 1/096775; H04N 23/57; H04N 23/90; H04N 7/18; H04N 7/181; H04N 7/183
See application file for complete search history.

(56) References Cited

U.S. PATENT DOCUMENTS

| | | | | |
|---|---|---|---|---|
| 2019/0361436 | A1 | 11/2019 | Ueda et al. | |
| 2021/0381197 | A1 * | 12/2021 | Otani | E02F 9/26 |
| 2023/0027809 | A1 * | 1/2023 | Akatsuka | G05D 1/0016 |

* cited by examiner

1: REMOTE OPERATION SYSTEM $$\begin{bmatrix} x' \\ y' \\ 1 \end{bmatrix} = \boldsymbol{H} \begin{bmatrix} x \\ y \\ 1 \end{bmatrix}$$

$\boldsymbol{H}$: HOMOGRAPHY MATRIX

REMOTE OPERATOR TERMINAL, IMAGE DISPLAY METHOD, AND REMOTE OPERATION SYSTEM

CROSS-REFERENCES TO RELATED APPLICATION

The present disclosure claims priority to Japanese Patent Application No. 2024-028341, filed on Feb. 28, 2024, the contents of which application are incorporated herein by reference in their entirety.

TECHNICAL FIELD

The present disclosure relates to a remote operation of a moving body performed by a remote operator. In particular, the present disclosure relates to delay compensation in the remote operation.

BACKGROUND ART

In a remote operation of a vehicle, an image (video) captured by an in-vehicle camera is transmitted from the vehicle to a remote operator terminal and is displayed on a display device of the remote operator terminal. Here, it is desired to compensate for a communication delay between the vehicle and the remote operator terminal. The following techniques are known as techniques related to the delay compensation of the image (video).

Patent Literature 1 discloses a remote video output system. The remote video output system includes an autonomous driving vehicle that transmits a video and a remote video output device that receives the video from the autonomous driving vehicle. The remote video output device estimates a change in a position of a point of view of the autonomous driving vehicle according to a communication delay time from the autonomous driving vehicle to the remote video output device. Then, the remote video output device cuts out a partial range from a frame of the received video in consideration of the change in the position of the point of view of the autonomous driving vehicle, and displays the video of the cut-out range.

Non-Patent Literature 1 discloses a delay compensation technique using homography. More specifically, the delay compensation technique performs the homography on an image received from a vehicle in order to change a point of view according to an amount of movement of the vehicle corresponding to a delay time, thereby achieving the delay compensation. In other words, the delay compensation technique visually performs the delay compensation by predicting a camera image viewed from a future point of view that is ahead by the delay time.

LIST OF RELATED ART

Patent Literature 1: International Publication WO 2018/155159

Non-Patent Literature 1: Kodai Matsubara and Manabu Omae, "Compensation of Camera Image Latency in Remotely Operated Vehicle using Projection Transformation," 19th ITS Symposium 2021, 4-A-12, December 2021.

SUMMARY

In a remote operation of a moving body, delay compensation may be performed on an image. However, in the above-described conventional techniques, the delay compensation with respect to a plurality of images respectively captured by a plurality of cameras is not considered. Further study and improvement are desired regarding the delay compensation with respect to a plurality of images respectively captured by a plurality of cameras.

As an example, let us consider a case where homography is performed for each of the plurality of images and then a plurality of transformed images are displayed side-by-side. In this case, an overlap between adjacent transformed images may occur. When a part of one transformed image is hidden by another transformed image, information that the remote operator can view is reduced.

A first aspect is directed to a remote operator terminal used by a remote operator for a remote operation of a moving body.

A first image is an image captured at a first timing by a camera mounted on the moving body.

A first point of view is defined by a combination of a position and a viewing direction of the camera at the first timing.

A second point of view is defined by a combination of a predicted position and a predicted viewing direction of the camera at a second timing later than the first timing.

A homography process converts the first image viewed from the first point of view into a second image viewed from the second point of view.

The remote operator terminal includes an information processing device.

The information processing device acquires a plurality of first images respectively captured at the first timing by a plurality of cameras mounted on the moving body.

The information processing device acquires a plurality of second images by applying the homography process to the plurality of first images, respectively.

The information processing device estimates a gaze direction of the remote operator.

The information processing device displays the plurality of second images side-by-side on a display of the remote operator terminal such that a priority second image corresponding to the gaze direction of the remote operator among the plurality of second images appears to be in front of other second images.

A second aspect is directed to a remote operator terminal used by a remote operator for a remote operation of a moving body.

A first image is an image captured at a first timing by a camera mounted on the moving body.

A first point of view is defined by a combination of a position and a viewing direction of the camera at the first timing.

A second point of view is defined by a combination of a predicted position and a predicted viewing direction of the camera at a second timing later than the first timing.

A homography process converts the first image viewed from the first point of view into a second image viewed from the second point of view.

The remote operator terminal includes an information processing device.

The information processing device acquires a plurality of first images respectively captured at the first timing by a plurality of cameras mounted on the moving body.

The information processing device acquires a plurality of second images by applying the homography process to the plurality of first images, respectively.

The information processing device displays the plurality of second images side-by-side on a display of the remote operator terminal.

A priority second image is one corresponding to a gaze direction of the remote operator among the plurality of second images.

A magnified second image is the priority second image or a second image displayed adjacent to the priority second image.

A magnified first image is a first image before the homography process that serves as a source of the magnified second image in the homography process.

The information processing device is further configured to adjust the plurality of first images before the homography process such that the magnified first image becomes larger than other first images.

A third aspect is directed to an image display method for displaying an image for a remote operator during a remote operation of a moving body.

A first image is an image captured at a first timing by a camera mounted on the moving body.

A first point of view is defined by a combination of a position and a viewing direction of the camera at the first timing.

A second point of view is defined by a combination of a predicted position and a predicted viewing direction of the camera at a second timing later than the first timing.

A homography process converts the first image viewed from the first point of view into a second image viewed from the second point of view.

The image display method includes:

- acquiring a plurality of first images respectively captured at the first timing by
- a plurality of cameras mounted on the moving body;
- acquiring a plurality of second images by applying the homography process to the plurality of first images, respectively;
- estimating a gaze direction of the remote operator; and
- displaying the plurality of second images side-by-side on a display of a remote operator terminal used by the remote operator such that a priority second image corresponding to the gaze direction of the remote operator among the plurality of second images appears to be in front of other second images.

A fourth aspect is directed to a remote operation system for a remote operation of a moving body performed by a remote operator.

A first image is an image captured at a first timing by a camera mounted on the moving body.

A first point of view is defined by a combination of a position and a viewing direction of the camera at the first timing.

A second point of view is defined by a combination of a predicted position and a predicted viewing direction of the camera at a second timing later than the first timing.

A homography process converts the first image viewed from the first point of view into a second image viewed from the second point of view.

The remote operation system includes one or more processors.

The one or more processors acquire a plurality of first images respectively captured at the first timing by a plurality of cameras mounted on the moving body.

The one or more processors acquire a plurality of second images by applying the homography process to the plurality of first images, respectively.

The one or more processors estimate a gaze direction of the remote operator.

The one or more processors display the plurality of second images side-by-side on a display of a remote operator terminal used by the remote operator such that a priority second image corresponding to the gaze direction of the remote operator among the plurality of second images appears to be in front of other second images.

According to the first, third, and fourth aspects, the priority second image corresponding to the gaze direction of the remote operator is displayed in front of the other second images. In other words, the priority second image corresponding to the gaze direction of the remote operator is displayed to be frontmost. Therefore, the remote operator is able to see at least the whole of the priority second image in the gaze direction. As a result, the accuracy of the remote operation is secured.

According to the second aspect, the size of the magnified second image generated from the magnified first image is large. This enables filling a gap around the priority second image corresponding to the gaze direction of the remote operator. As a result, the appearance is improved, and a sense of discomfort felt by the remote operator is suppressed.

DETAILED DESCRIPTION

Embodiments of the present disclosure will be described with reference to the accompanying drawings.

1. Remote Operation System

A remote operation (remote driving) of a moving body is considered. Examples of the moving body being a target of the remote operation include a vehicle, a robot, a flying object, and the like. The vehicle may be an autonomous driving vehicle or may be a vehicle driven by a driver. Examples of the robot include a logistic robot, a work robot, and the like. Examples of the flying object include a drone or the like. As an example, in the following description, a case where the moving body is a vehicle will be considered. When generalizing, "vehicle" in the following description shall be deemed to be replaced with "moving body."

Figure 1:
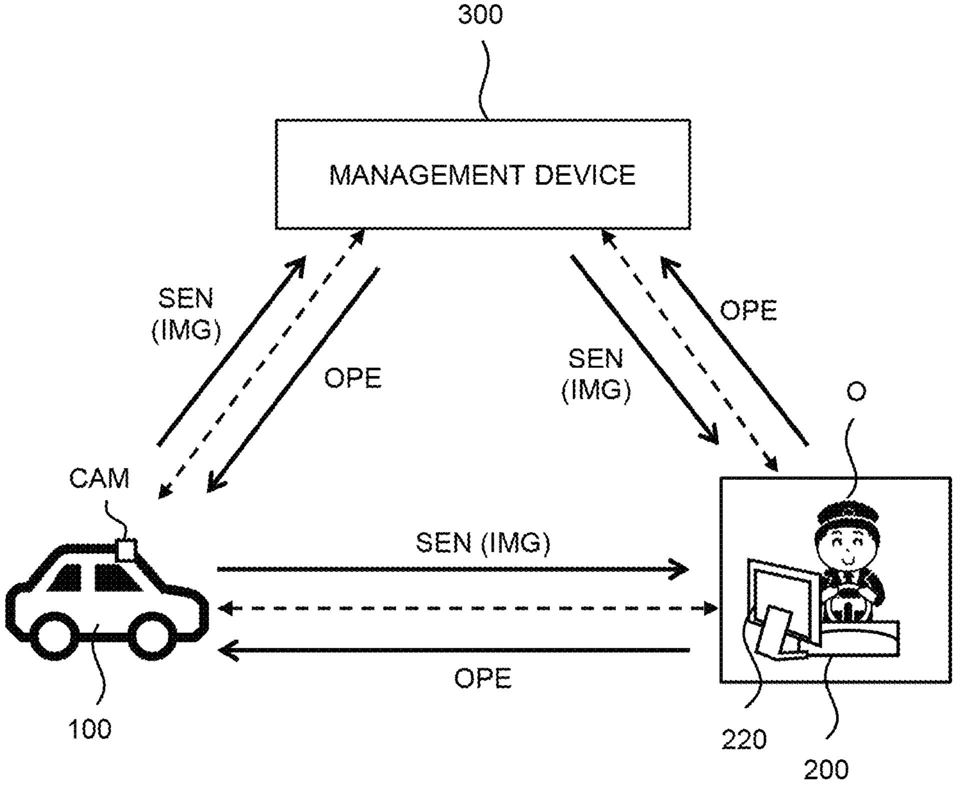
FIG. 1 is a schematic diagram showing an example of a configuration of a remote operation system.

FIG. 1 is a schematic diagram showing a configuration example of a remote operation system 1 according to the present embodiment. The remote operation system 1 includes a vehicle 100, a remote operator terminal 200, and a management device 300. The vehicle 100 is the target of the remote operation. The remote operator terminal 200 is a terminal device used by a remote operator for the remote operation of the vehicle 100. The remote operator terminal 200 can also be referred to as a remote operation human machine interface (HMI). The management device 300 manages the remote operation system 1. Typically, the management device 300 is a management server on a cloud. The management server may be configured by a plurality of servers that perform distributed processing.

The vehicle 100, the remote operator terminal 200, and the management device 300 are capable of communicating with each other via a communication network. The vehicle 100 and the remote operator terminal 200 can communicate with each other via the management device 300. The vehicle 100 and the remote operator terminal 200 may directly communicate with each other without through the management device 300.

Various sensors including a camera CAM are mounted on the vehicle 100. The camera CAM images a situation around the vehicle 100 to acquire an image (video) IMG indicating the situation around the vehicle 100. Sensor detection information SEN includes information acquired by the various sensors. The sensor detection information SEN includes at least the image IMG captured (taken) by the camera CAM. The sensor detection information SEN may include a position and a state (e.g., a speed, a steering angle, and the like) of the vehicle 100. The vehicle 100 transmits the sensor detection information SEN to the remote operator terminal 200.

The remote operator terminal 200 receives the sensor detection information SEN transmitted from the vehicle 100. The remote operator terminal 200 presents the sensor detection information SEN to the remote operator O. More specifically, the remote operator terminal 200 includes a display device 220, and displays information such as the image IMG on the display device 220. The remote operator O views the displayed information, recognizes the situation around the vehicle 100, and performs the remote operation of the vehicle 100. That is, displaying the information for the remote operator O on the display device 220 makes it possible to support the remote operation of the vehicle 100 performed by the remote operator O.

Remote operation information OPE is information relating to the remote operation performed by the remote operator O. For example, the remote operation information OPE includes an operation amount input by the remote operator O. The remote operator terminal 200 transmits the remote operation information OPE to the vehicle 100. The vehicle 100 receives the remote operation information OPE transmitted from the remote operator terminal 200. The vehicle 100 performs vehicle travel control in accordance with the received remote operation information OPE. In this manner, the remote operation of the vehicle 100 is realized.

2. Delay Compensation Process Using Homography

The remote operation of the vehicle 100 is accompanied by a communication delay between the vehicle 100 and the remote operator terminal 200. The communication delay may destabilize a behavior of the vehicle 100 during the remote operation. In addition, the communication delay may cause a decrease in accuracy of the remote operation of the vehicle 100. Therefore, it is important to perform delay compensation during the remote operation of the vehicle 100.

The remote operation system 1 according to the present embodiment visually performs the delay compensation on the image IMG displayed on the display device 220 in consideration of the communication delay. In particular, the remote operation system 1 according to the present embodiment visually performs the delay compensation on the image IMG by using "homography". The delay compensation process is performed by, for example, the remote operator terminal 200. However, the entity of the delay compensation process is not limited to the remote operator terminal 200. At least a part of the delay compensation process may be executed by the vehicle 100 or the management device 300.

Figure 2:
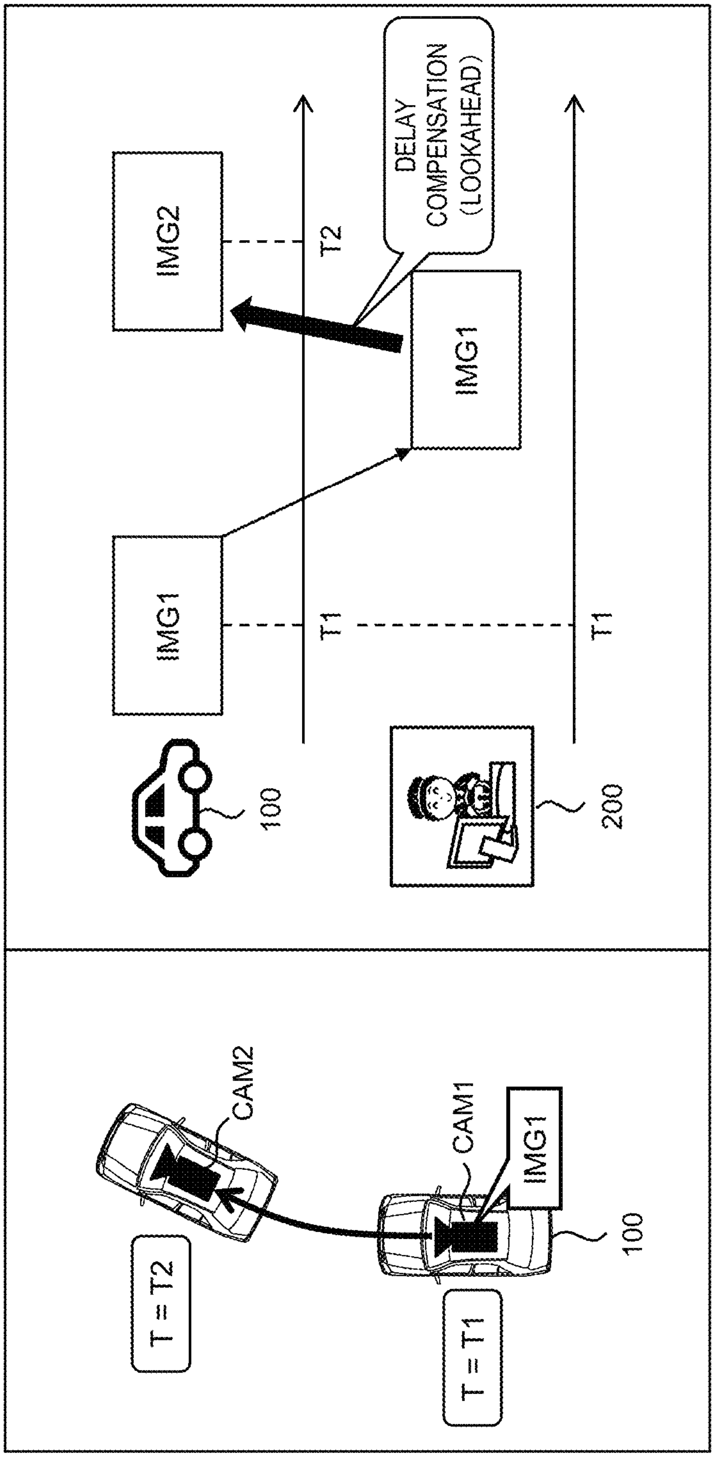
FIG. 2 is a conceptual diagram for explaining an overview of a delay compensation process.

FIG. 2 is a conceptual diagram for explaining an overview of the delay compensation process performed by the remote operation system 1. A first image IMG1 is the image IMG actually captured at a first timing T1 by the camera CAM mounted on the vehicle 100. The first image IMG1 is transmitted from the vehicle 100 to the remote operator terminal 200. The remote operator terminal 200 acquires the first image IMG1 after the first timing T1. If an image IMG that will be captured in the future can be predicted from the first image IMG1 (i.e., if lookahead is possible), it is possible to perform the delay compensation.

A second timing T2, which is a target timing of the lookahead (predicting), is a timing later than the first timing T1. A difference between the second timing T2 and the first timing T1 corresponds to a "delay compensation time". The remote operation system 1 may set at least a part of a round-trip communication delay time between the vehicle 100 and the remote operator terminal 200 as the delay compensation time. The communication delay time between the vehicle 100 and the remote operator terminal 200 can be estimated by a publicly known technique. The delay compensation time may be set to the round-trip communication delay time between the vehicle 100 and the remote operator terminal 200. The delay compensation time may be set to a communication time from when the image IMG is transmitted from the vehicle 100 to when the image IMG reaches the remote operator terminal 200. Alternatively, the delay compensation time may be set to a constant value. In either case, the remote operation system 1 sets the second timing T2 to be later than the first timing T1 by the delay compensation time.

For convenience, the camera CAM at the first timing T1 is referred to as a first camera CAM1, and the camera CAM at the second timing T2 is referred to as a second camera CAM2. A first point of view, which is a point of view of the first camera CAM1, is defined by a combination of a position and a viewing direction of the first camera CAM1 at the first timing T1. A second point of view, which is a point of view of the second camera CAM2, is defined by a combination of a predicted position and a predicted viewing direction of the second camera CAM2 at the second timing T2.

The remote operation system 1 acquires camera information CINF regarding the camera CAM mounted on the vehicle 100. The camera information CINF includes installation information and performance information of the camera CAM. The installation information indicates an installation position and an installation direction of the camera CAM in a vehicle coordinate system. The performance information indicates a focal length, an angle of view, and the like of the camera CAM. Since the camera CAM is fixed to the vehicle 100, using the installation information of the camera CAM makes it possible to convert a direction and an amount of movement of the vehicle 100 into a direction and an amount of movement of the camera CAM in a camera coordinate system. In other words, it is possible to estimate a change in the point of view of the camera CAM based on the installation information of the camera CAM and the direction and the amount of movement of the vehicle 100.

More specifically, the remote operation system 1 estimates the direction and the amount of movement of the vehicle 100 in the period from the first timing T1 to the second timing T2 (that is, the delay compensation time). For example, the remote operation system 1 estimates the direction and the amount of movement of the vehicle 100 in the period from the first timing T1 to the second timing T2 based on a speed and a steering angle of the vehicle 100 at the first timing T1 and the delay compensation time. The information of the speed and steering angle of the vehicle 100 is obtained from the sensor detection information SEN provided from the vehicle 100. Alternatively, a steering angle in a steering operation performed by the remote operator O may be regarded as the steering angle of the vehicle 100. It may be assumed that the vehicle 100 makes a steady circular turn. Then, the remote operation system 1 calculates the difference between the first point of view and the second point of view based on the above-mentioned camera information CINF (installation information) and the amount and the direction of movement of the vehicle 100 in the delay compensation time.

It can be said that the first image IMG1 is the image IMG taken from the first point of view, that is, the image IMG viewed from the first point of view. The image IMG expected to be taken from the second point of view, that is, the image IMG expected to be viewed from the second point of view is hereinafter referred to as a "second image IMG2". The remote operation system 1 converts the first image IMG1 viewed from the first point of view into the second image IMG2 viewed from the second point of view based on the difference between the first point of view and the second point of view. In other words, the remote operation system 1 predicts (prefetches) the second image IMG2 viewed from the second point of view, based on the first image IMG1 viewed from the first point of view. Homography is used for the predicting (i.e., lookahead).

Figure 3:
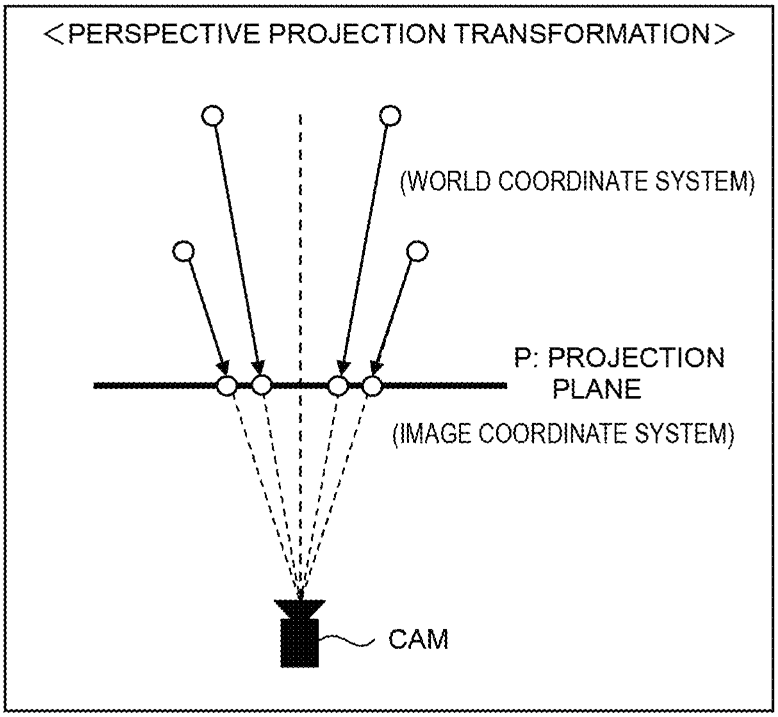
FIG. 3 is a conceptual diagram for explaining homography based on perspective projection transformation.
Figure 3:
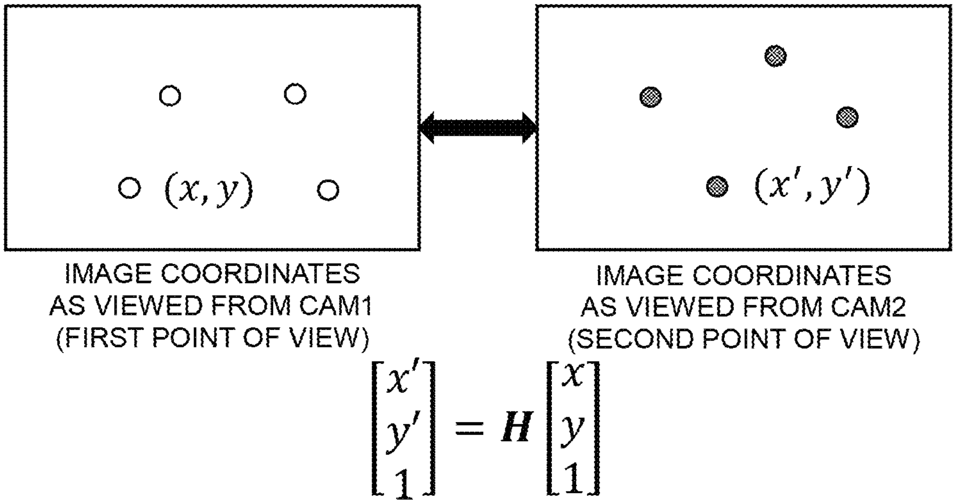

FIG. 3 is a conceptual diagram for explaining the homography. The homography is performed based on perspective projection transformation. The perspective projection transformation is a rendering technique for drawing an object present in a three dimensional space on a two dimensional plane as viewed from the camera CAM. To that end, the perspective projection transformation projects points in the three dimensional space onto a projection plane P in consideration of the point of view of the camera CAM. The projection plane P is associated with the camera CAM. For example, the projection plane P is a plane orthogonal to an optical axis of the camera CAM. It should be noted that a point in the three dimensional space is defined in a three dimensional world coordinate system (i.e., the absolute coordinate system). On the other hand, the point projected on the projection plane P is defined in a two dimensional image coordinate system.

For example, N virtual points are virtually set in the three dimensional world coordinate system. Here, N is an integer of 4 or more. The N virtual points as viewed from the first camera CAM1 (i.e., the first point of view) are projected onto a first projection plane P1 associated with the first camera CAM1 by the perspective projection transformation. Further, the N virtual points viewed from the second camera CAM2 (i.e., the second point of view) are projected onto a second projection plane P2 associated with the second camera CAM2 by the perspective projection transformation. The second point of view can be obtained from the difference between the first point of view and the second point of view. Image coordinates of the virtual points on the first projection plane P1 as viewed from the first camera CAM1 (i.e., the first point of view) are given by [x,y]. On the other hand, image coordinates of the virtual points on the second projection plane P2 as viewed from the second camera CAM2 (i.e., the second point of view) are given by [x',y']. Based on a comparison between the two kinds of image coordinates, a homography matrix H for transforming from the first point of view to the second point of view is calculated. Then, the homography matrix H is applied to the entire first image IMG1 actually taken by the first camera CAM1, and thereby the second image IMG2 expected to be viewed from the second point of view is generated.

Figure 4:
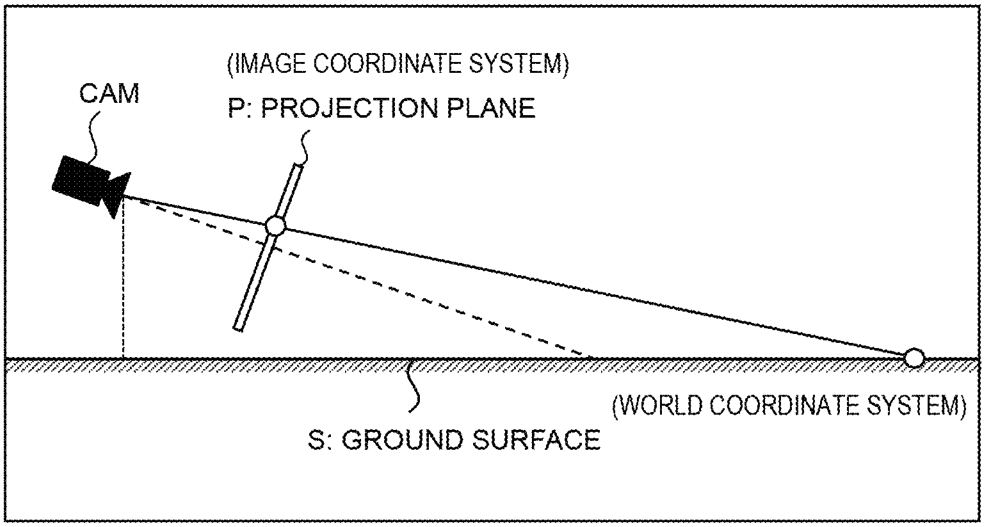
FIG. 4 is a conceptual diagram for explaining homography based on perspective projection transformation.

As another example, the method described in the above-mentioned Non-Patent Literature 1 may be used. More specifically, each image coordinate point on the first image IMG1 (projection plane P) is transformed into a world coordinate point in the world coordinate system by inverse transformation of the perspective projection transformation. Then, the world coordinate point as viewed from the first point of view is converted into a world coordinate point as viewed from the second point of view, based on the difference between the first point of view and the second point of view. Then, the world coordinate point as viewed from the second point of view is re-projected onto the projection plane P by the perspective projection transformation. As a result, the second image IMG2 that is expected to be viewed from the second point of view is generated. According to Non-Patent Literature 1, it is assumed that what is shown in the entire image IMG is a ground surface S as shown in FIG. 4.

Figure 5:
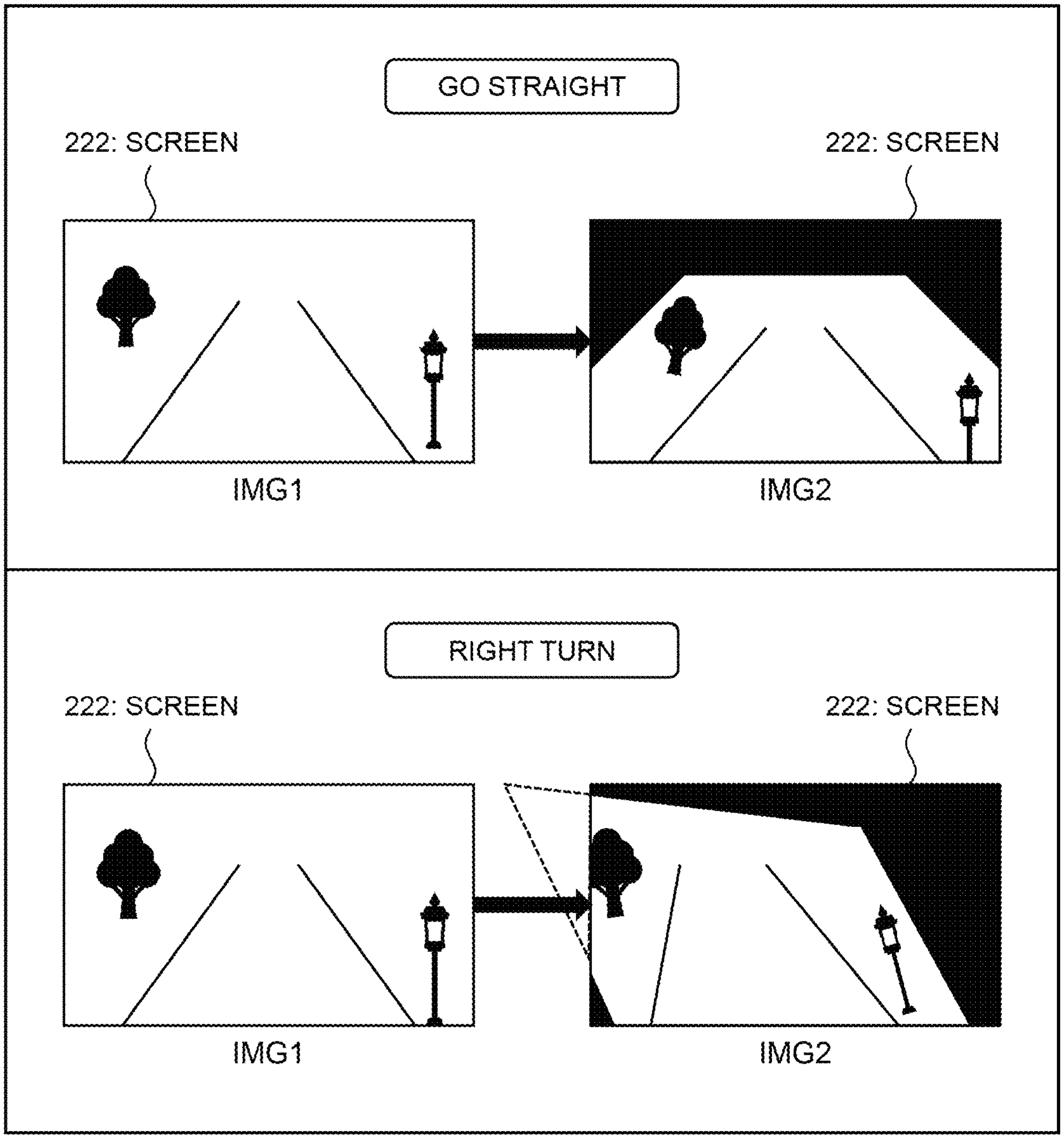
FIG. 5 is a conceptual diagram for explaining an example of image deformation due to the homography.

FIG. 5 is a conceptual diagram for explaining an example of image deformation due to the homography (see Non-Patent Literature 1). The first image IMG1 is the original image before the homography. The second image IMG2 is generated by applying the homography to the first image IMG1. FIG. 5 shows how each of the first image IMG1 and the second image IMG2 looks on a screen 222 of the display device 220. For example, when the vehicle 100 goes straight, the second image IMG2 looks like falling down to the back. As another example, in a case of a right turn, the second image IMG2 looks like falling down to the left.

3. Homography Process in Case of Multiple Cameras

In the following description, a "homography process" means the delay compensation process using the homography described in the above Section 2. The homography process converts (transforms) the first image IMG1 viewed from the first point of view into the second image IMG2 viewed from the second point of view, based on the perspective projection transformation using the projection plane P associated with the camera CAM. The remote operation system 1 is able to perform the delay compensation by applying the homography process to the image IMG captured (taken) by the camera CAM. The homography process is executed by, for example, the remote operator terminal 200. However, the entity of the homography process is not limited to the remote operator terminal 200. At least a part of the homography process may be executed by the vehicle 100 or the management device 300.

Here, a case where a plurality of cameras CAM are mounted on the vehicle 100 is considered. The installation directions of the plurality of cameras CAM in the vehicle coordinate system are different from each other. For example, the plurality of cameras CAM include a front camera CAM-F for taking the image in the front direction, a left camera CAM-L for taking the image in the left front direction, and a right camera CAM-R for taking the image in the right front direction. However, constituent elements of the plurality of cameras CAM are not limited thereto.

The remote operator terminal 200 acquires a plurality of images IMG respectively captured by the plurality of cameras CAM mounted on the vehicle 100. Then, the remote operator terminal 200 displays the plurality of images IMG on the display device 220. The remote operator terminal 200 may display the plurality of images IMG side-by-side on one or more screens 222 of the display device 220.

Hereinafter, the homography process with respect to the plurality of images IMG respectively captured by the plurality of cameras CAM will be considered.

3-1. First Example

Figure 6:
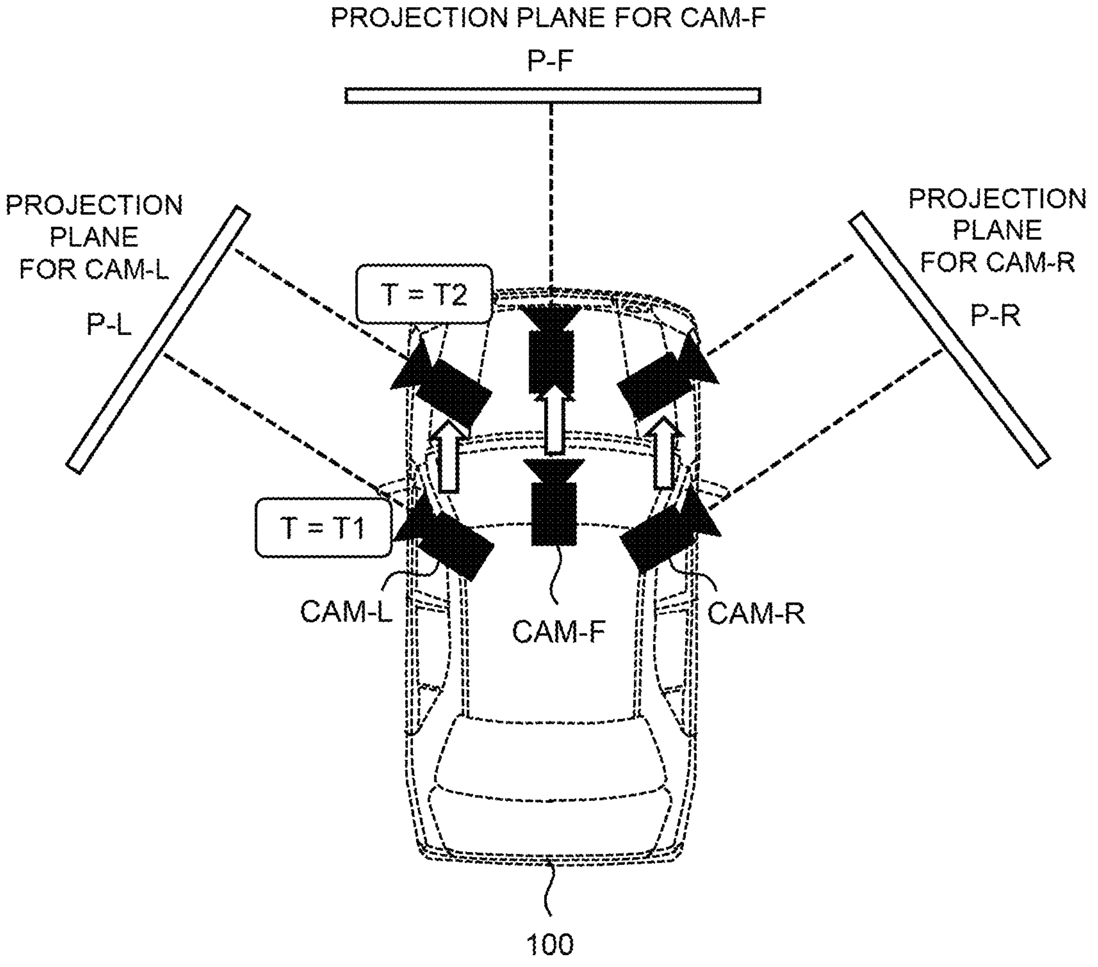
FIG. 6 is a conceptual diagram for explaining a first example of a homography process in a case of a plurality of cameras.

FIG. 6 is a conceptual diagram for explaining the first example. The projection planes P-F, P-L, and P-R are projection planes P associated with the front camera CAM-F, the left camera CAM-L, and the right camera CAM-R, respectively. For example, the projection plane P-F is orthogonal to the optical axis of the front camera CAM-F, the projection plane P-L is orthogonal to the optical axis of the left camera CAM-L, and the projection plane P-R is orthogonal to the optical axis of the right camera CAM-R. The projection planes P-F, P-L, and P-R are different from each other.

The installation directions of the plurality of cameras CAM (CAM-F, CAM-L, and CAM-R) are different from each other. Therefore, as shown in FIG. 6, a change in the point of view of the camera CAM with respect to the projection plane P when the vehicle 100 moves in a certain direction is different among the plurality of cameras CAM (CAM-F, CAM-L, and CAM-R).

The remote operation system 1 acquires a plurality of first images IMG1 (IMG1-F, IMG1-L, and IMG1-R) respectively captured by the plurality of cameras CAM (CAM-F, CAM-L, and CAM-R) at the first timing T1. The remote operation system 1 applies the homography process to the plurality of first images IMG1 (IMG1-F, IMG1-L, IMG1-R) to acquire a plurality of second images IMG2 (IMG2-F, IMG2-L, IMG2-R), respectively. In the first example, the plurality of different projection planes P (P-F, P-L, P-R) are used for the plurality of first images IMG1 (IMG1-F, IMG1-L, IMG1-R), respectively. That is, the remote operation system 1 generates the second image IMG2-F by applying the homography process using the projection plane P-F to the first image IMG1-F captured by the front camera CAM-F. Moreover, the remote operation system 1 generates the second image IMG2-L by applying the homography process using the projection plane P-L to the first image IMG1-L captured by the left camera CAM-L. Further, the remote operation system 1 generates the second image IMG2-R by applying the homography process using the projection plane P-R to the first image IMG1-R captured by the right camera CAM-R.

Figure 7:
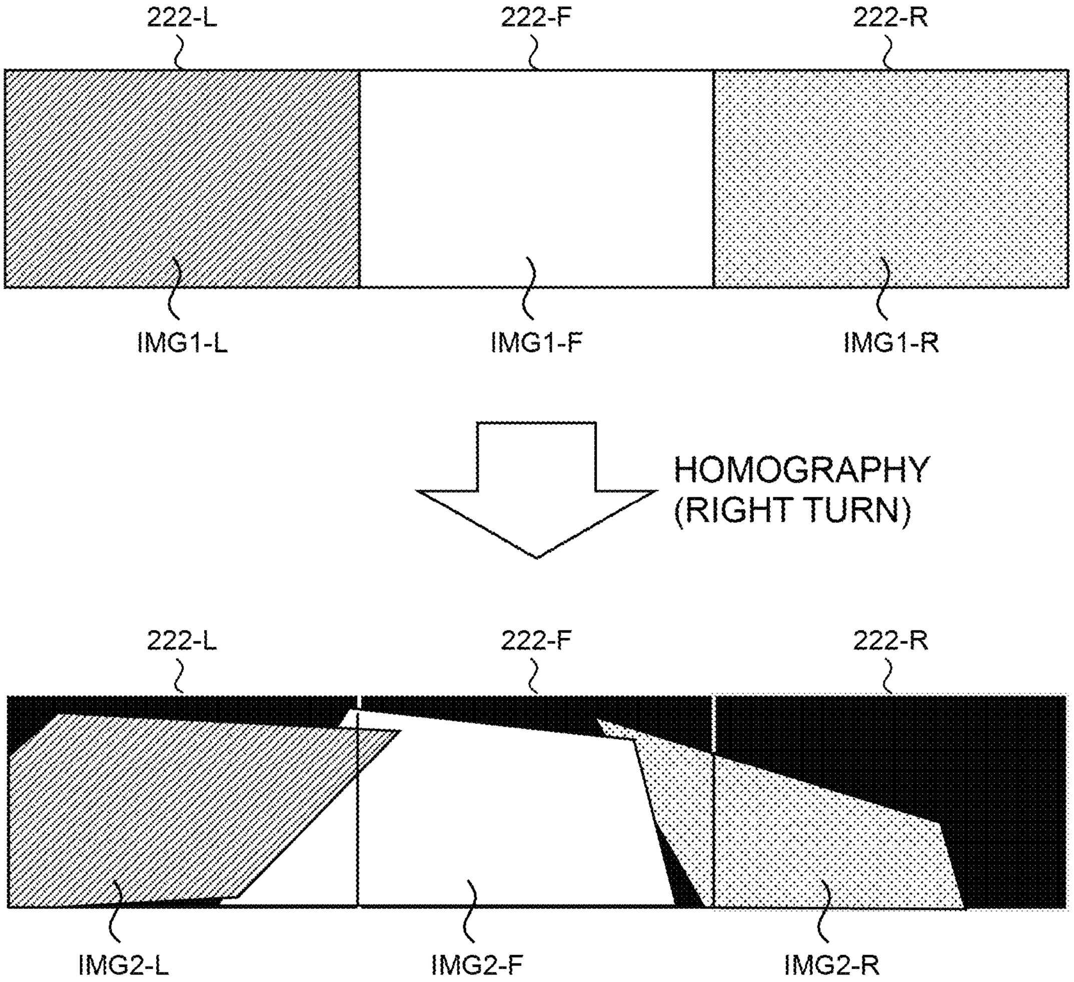
FIG. 7 is a conceptual diagram for explaining the first example of the homography process in the case of the plurality of cameras.

FIG. 7 shows a display example of the plurality of images IMG in the case of the first example. In the example shown in FIG. 7, the display device 220 includes a plurality of screens 222-F, 222-L, and 222-R. The plurality of screens 222-F, 222-L, and 222-R are lined up next to each other in a row. More specifically, the screen 222-L and the screen 222-R are placed on both sides of the screen 222-F, and the screen 222-F is sandwiched between the screen 222-L and the screen 222-R.

If the homography process is not performed, the remote operator terminal 200 displays the plurality of first images IMG1 (IMG1-F, IMG1-L, and IMG1-R) on the plurality of screens 222 (222-F, 222-L, and 222-R) of the display device 220, respectively.

When the homography process is performed, the remote operator terminal 200 acquires the plurality of second images IMG2 (IMG2-F, IMG2-L, and IMG2-R) from the plurality of first images IMG1 (IMG1-F, IMG1-L, and IMG1-R), respectively. In the example shown in FIG. 7, the vehicle 100 is turning to the right. The remote operator terminal 200 displays the plurality of second images IMG2 (IMG2-F, IMG2-L, IMG2-R) on the display device 220. For example, the remote operator terminal 200 displays the plurality of second images IMG2 (IMG2-F, IMG2-L, and IMG2-R) side-by-side on one or more screens 222 of the display device 220. The remote operator terminal 200 may display the plurality of second images IMG2 (IMG2-F, IMG2-L, IMG2-R) side-by-side on a plurality of screens 222 (222-F, 222-L, 222-R), respectively. In this case, the second image IMG2-F is roughly arranged on the screen 222-F, but a part of the second image IMG2-F may protrude to the screens 222-L and 222-R adjacent to the screen 222-F. Similarly, the second image IMG2-L is roughly arranged on the screen 222-L, but a part of the second image IMG2-L may protrude to the screen 222-F adjacent to the screen 222-L. Similarly, the second image IMG2-R is roughly arranged on the screen 222-R, but a part of the second image IMG2-R may protrude to the screen 222-F adjacent to the screen 222-R.

3-2. Second Example

As shown in the above FIG. 7, respective shapes of the plurality of second images IMG2 do not necessarily match. Therefore, when the plurality of second images IMG2 are displayed side-by-side on the display device 220, boundary lines of the adjacent second images IMG2 may not match and thus an "overlap" between the adjacent second images IMG2 may occur. When a part of a certain second image IMG2 is hidden by another second image IMG2, information that the remote operator O can view is reduced.

In view of the above, the second example proposes a technique that is capable of appropriately presenting necessary information to the remote operator O. It should be noted that the description overlapping with that in the first example described above will be omitted as appropriate.

Figure 8:
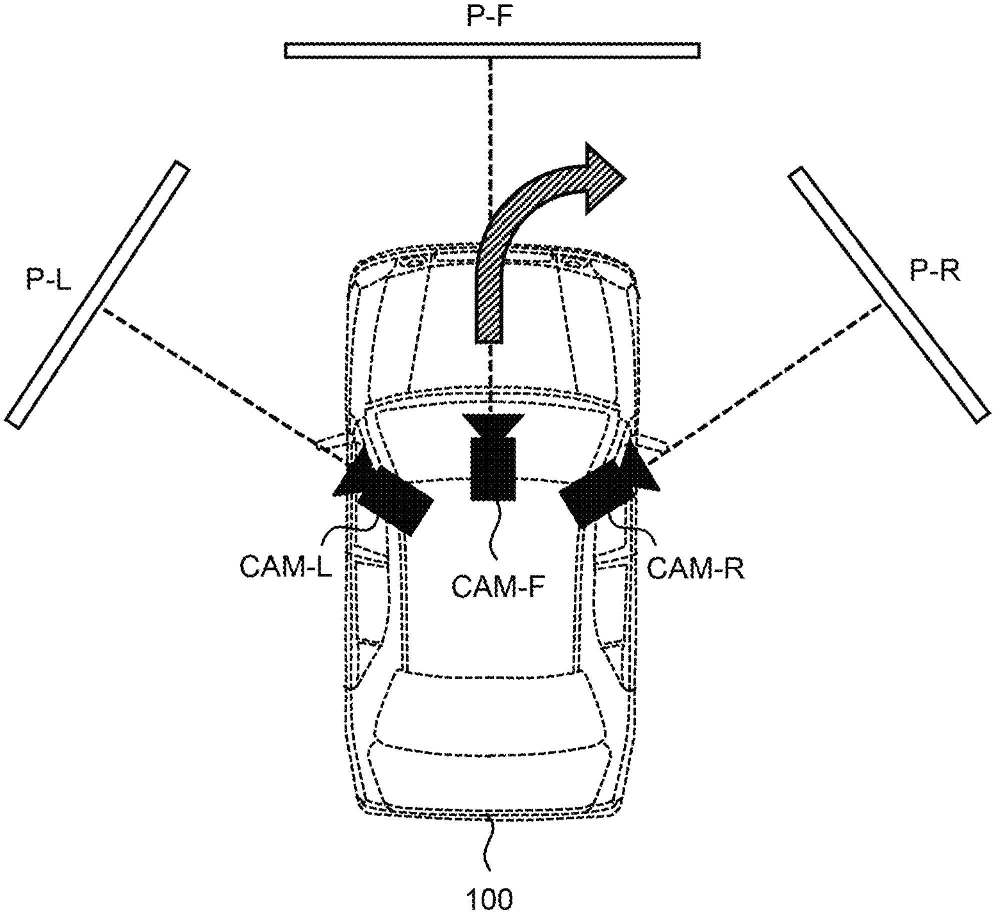
FIG. 8 is a conceptual diagram for explaining a second example of the homography process in the case of the plurality of cameras.
Figure 9:
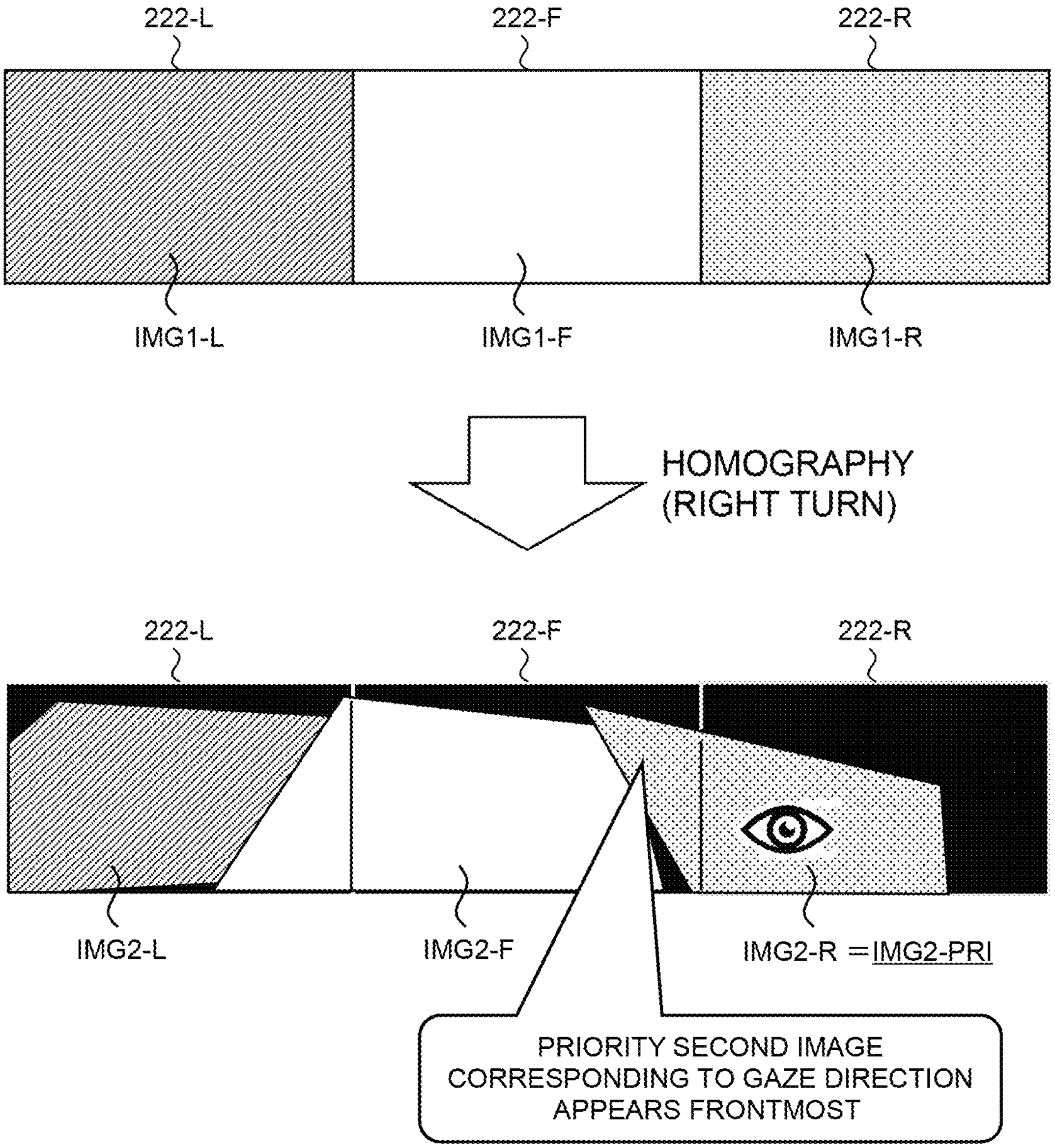
FIG. 9 is a conceptual diagram for explaining the second example of the homography process in the case of the plurality of cameras.

As an example, a situation where the vehicle 100 turns to the right as shown in FIG. 8 will be considered. FIG. 9 shows a display example of the plurality of second images IMG2 at the time of right turn. At the time of right turn, the remote operator O gazes mainly at the second image IMG2-R on the right side. Therefore, the remote operation system 1 displays the plurality of second images IMG2 (IMG2-F, IMG2-L, and IMG2-R) side-by-side such that the second image IMG2-R on the right side appears to be in front of the others. In other words, the second image IMG2-R on the right side is displayed to be frontmost. Therefore, the remote operator O is able to see at least the whole of the second image IMG2-R in the gaze direction. As a result, the accuracy of the remote operation is secured. Although the second images IMG2-F and IMG2-L may not be displayed in their entirety, its influence on the accuracy of the remote operation is small, because the remote operator O does not gaze at the second images IMG2-F and IMG2-L.

When generalizing, the second image IMG2 corresponding to a gaze direction of the remote operator O is hereinafter referred to as a "priority second image IMG2-PRI". The camera CAM corresponding to the gaze direction of the remote operator O is hereinafter referred to as a "priority camera CAM-PRI". The priority second image IMG2-PRI is a second image IMG2 obtained by applying the homography process to the first image IMG1 captured by the priority camera CAM-PRI.

According to the second example, the remote operation system 1 estimates the gaze direction of the remote operator O. Then, the remote operation system 1 dynamically selects the priority camera CAM-PRI and the priority second image IMG2-PRI in consideration of the gaze direction of the remote operator O. In other words, the remote operation system 1 dynamically switches the priority camera CAM-PRI and the priority second image IMG2-PRI in conjunction with the gaze direction of the remote operator O.

Figure 10:
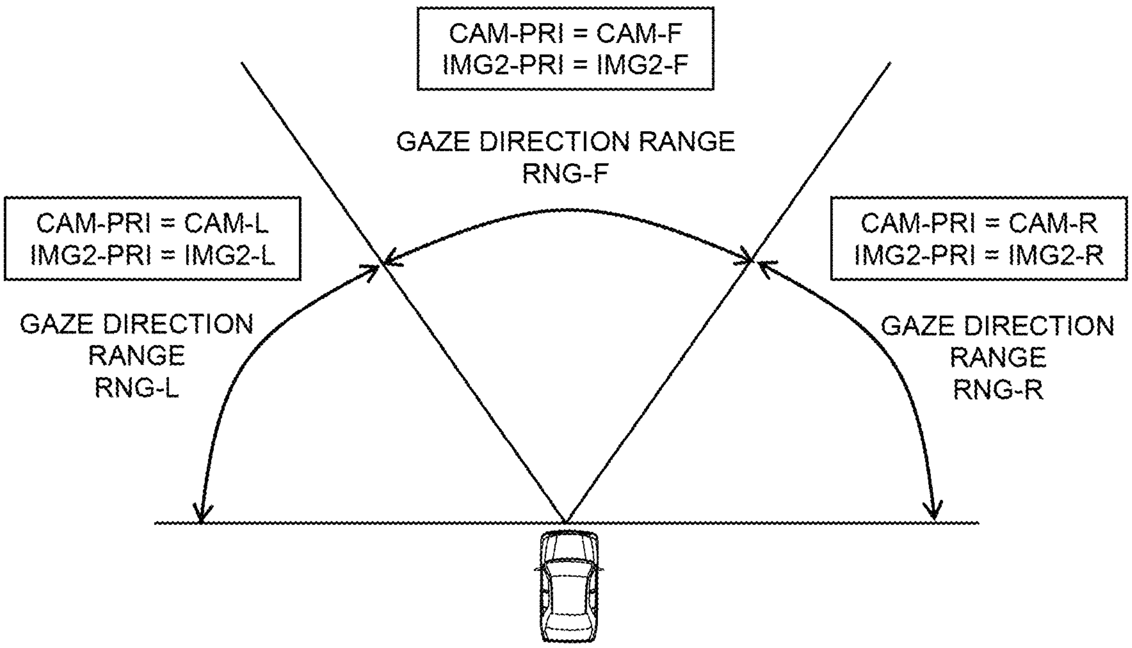
FIG. 10 is a conceptual diagram for explaining the second example of the homography process in the case of the plurality of cameras.

FIG. 10 is a conceptual diagram for explaining a correspondence relationship between the gaze direction of the remote operator O and the priority second image IMG2-PRI. When the gaze direction of the remote operator O is within a gaze direction range RNG-F, the remote operation system 1 selects the front camera CAM-F as the priority camera CAM-PRI and selects the second image IMG2-F as the priority second image IMG2-PRI. When the gaze direction of the remote operator O is within a gaze direction range RNG-L, the remote operation system 1 selects the left camera CAM-L as the priority camera CAM-PRI and selects the second image IMG2-L as the priority second image IMG2-PRI. When the gaze direction of the remote operator O is within a gaze direction range RNG-R, the remote operation system 1 selects the right camera CAM-R as the priority camera CAM-PRI and selects the second image IMG2-R as the priority second image IMG2-PRI.

The gaze direction of the remote operator O is estimated based on, for example, a steering angle of a steering operation performed by the remote operator O. In this case, a predetermined steering angle range θ-F including straight traveling is associated with the gaze direction range RNG-F. Moreover, a steering angle range θ-R on the right direction side of the predetermined steering angle range θ-F is associated with the gaze direction range RNG-R. Further, a steering angle range θ-L on the left direction side of the predetermined steering angle range θ-F is associated with the gaze direction range RNG-L. The remote operation system 1 estimates the gaze direction of the remote operator O based on the steering angle of the steering operation performed by the remote operator O. More specifically, the remote operation system 1 selects a steering angle range θ-X (X=F or L or R) including the steering angle of the steering operation performed by the remote operator O. Further, the remote operation system 1 estimates that the gaze direction of the remote operator O is included in the gaze direction range RNG-X associated with the selected steering angle range θ-X. Then, the remote operation system 1 selects the camera CAM-X associated with the gaze direction range RNG-X as the priority camera CAM-PRI.

As another example, the gaze direction of the remote operator O may be estimated from a direction of a line of sight of the remote operator O. More specifically, the direction of the line of sight of the remote operator O is detected by an operator monitor 240 (described later) of the remote operator terminal 200. The detected direction of the line of sight of the remote operator O is regarded as the gaze direction of the remote operator O. The remote operation system 1 selects the camera CAM-X associated with the gaze direction range RNG-X including the gaze direction (the line of sight direction) of the remote operator O as the priority camera CAM-PRI.

As described above, the remote operation system 1 estimates the gaze direction of the remote operator O, and dynamically selects the priority camera CAM-PRI and the priority second image IMG2-PRI according to the gaze direction of the remote operator O. Then, the remote operation system 1 displays the plurality of second images IMG2 side-by-side such that the priority second image IMG2-PRI appears to be in front of the other second images IMG2. In other words, the priority second image IMG2-PRI corresponding to the gaze direction of the remote operator O is displayed to be frontmost. Therefore, the remote operator O is able to see at least the whole of the priority second image IMG2-PRI in the gaze direction. As a result, the accuracy of the remote operation is secured.

3-3. Third Example

As shown in the above FIG. 7, respective shapes of the plurality of second images IMG2 do not necessarily match. Therefore, when the plurality of second images IMG2 are displayed side-by-side on the display device 220, boundary lines of the adjacent second images IMG2 may not match and thus a "gap" between the adjacent second images IMG2 may occur. This may bring a sense of discomfort to the remote operator O.

In view of the above, the third example proposes a technique that is capable of suppressing the sense of discomfort felt by the remote operator O. It should be noted that the descriptions overlapping with those in the first example and the second example described above will be omitted as appropriate.

Figure 11:
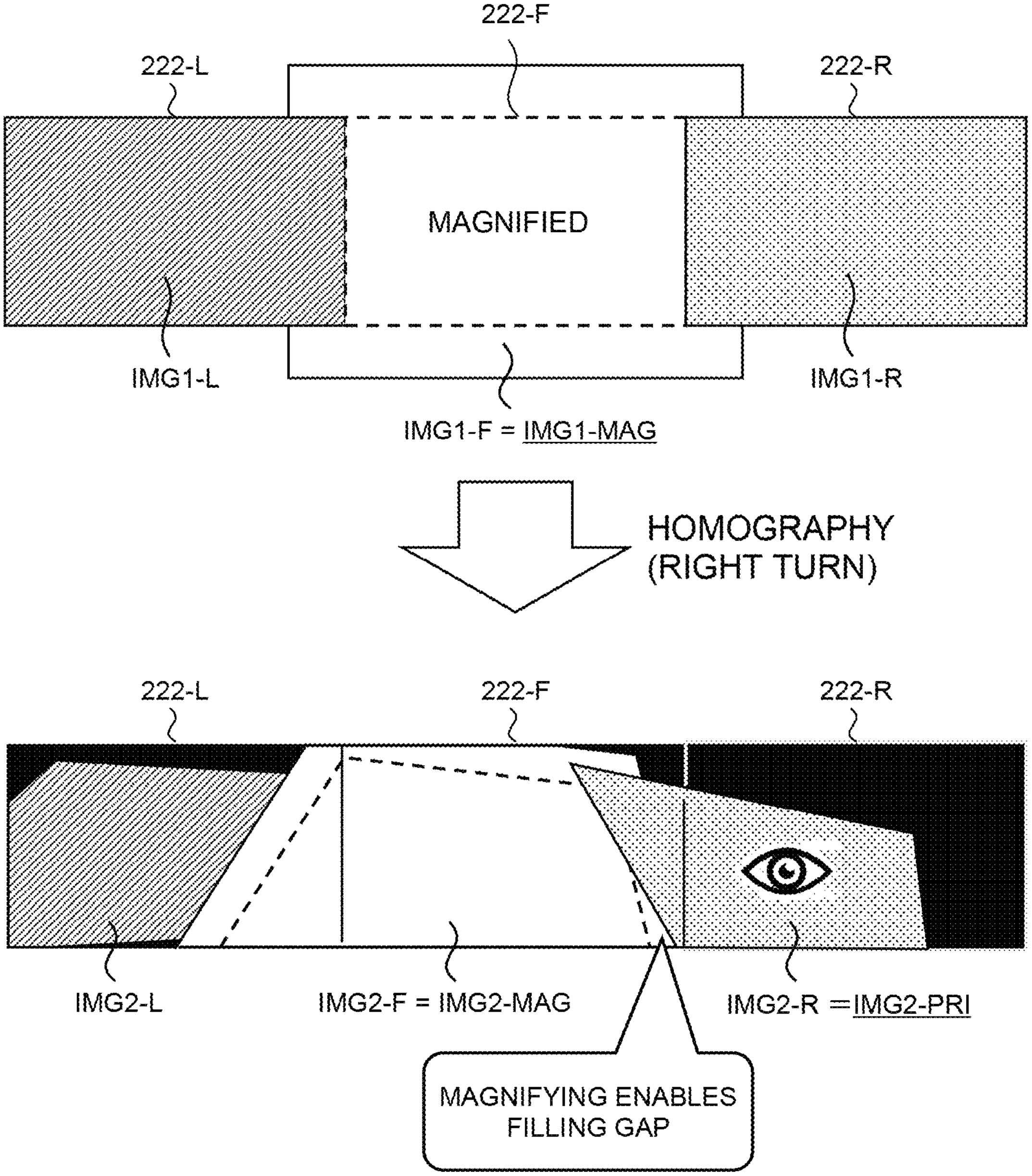
FIG. 11 is a conceptual diagram for explaining a third example of the homography process in the case of the plurality of cameras.

FIG. 11 is a conceptual diagram for explaining the third example. In the example shown in FIG. 11, the second image IMG2-R is the priority second image IMG2-PRI corresponding to the gaze direction of the remote operator O. If at least a gap between the priority second image IMG2-PRI and the adjacent second image IMG2-F is filled, the sense of discomfort felt by the remote operator O is considered to be suppressed. Therefore, a size of the second image IMG2-F adjacent to the priority second image IMG2-PRI is set to be larger than usual. Alternatively, a size of the priority second image IMG2-PRI itself may be set to be larger than usual.

When generalizing, the priority second image IMG2-PRI or a second image IMG2 displayed adjacent to the priority second image IMG2-PRI is hereinafter referred to as a "magnified second image IMG2-MAG". A first image IMG1 that serves as the source of the magnified second image IMG2-MAG is hereinafter referred to as a "magnified first image IMG1-MAG". The magnified second image IMG2-MAG is obtained by applying the homography process to the magnified first image IMG1-MAG. In the example shown in FIG. 11, the first image IMG1-F is the magnified first image IMG1-MAG, and the second image IMG2-F is the magnified second image IMG2-MAG.

The remote operation system 1 adjusts the plurality of first images IMG1 (IMG1-F, IMG1-L, IMG1-R) before the homography process such that the magnified first image IMG1-MAG becomes larger than the other first images IMG1. The first image IMG1 to be magnified can be recognized based on the above-described priority camera CAM-PRI.

Figure 12:
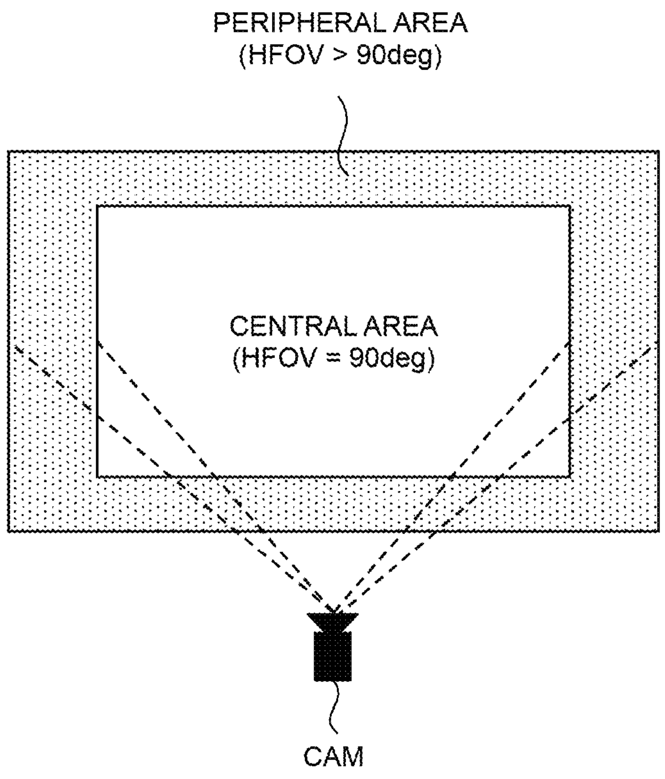
FIG. 12 is a conceptual diagram for explaining the third example of the homography process in the case of the plurality of cameras.

FIG. 12 is a conceptual diagram for explaining an example of a method for realizing the magnified first image IMG1-MAG. The image IMG captured by the camera CAM includes a "central area" and a "peripheral area" around the central area. More specifically, an angle of view of the camera CAM includes a "central angle of view" and a "peripheral angle of view" around the central angle of view. For example, the central angle of view is a range corresponding to a horizontal field of view (HFOV)=90 degrees, and the peripheral angle of view is a range corresponding to the horizontal field of view>90 degrees. The central area is an image area corresponding to the central angle of view in the image IMG. On the other hand, the peripheral area is an image area corresponding to the peripheral angle of view in the image IMG.

By default, only the central area of the image IMG captured by the camera CAM is used as the first image IMG1. However, both the central area and the peripheral area are used for the first image IMG1 to be magnified. That is to say, the magnified first image IMG1-MAG includes both the central area and the peripheral area. The remote operation system 1 adjusts the plurality of first images IMG1 in advance such that the magnified first image IMG1-MAG includes both the central area and the peripheral area while the other first images IMG1 each includes only the central area.

After the adjustment, the remote operation system 1 applies the homography process to the plurality of first images IMG1 (IMG1-F, IMG1-L, IMG1-R) to acquire the plurality of second images IMG2 (IMG2-F, IMG2-L, IMG2-R), respectively. At this time, the magnified second image IMG2-MAG is obtained from the magnified first image IMG1-MAG. The remote operation system 1 displays the plurality of second images IMG2 (IMG2-F, IMG2-L, IMG2-R) thus obtained side-by-side on the display device 220.

As shown in FIG. 11, the size of the magnified second image IMG2-MAG is large. This enables filling the gaps around the priority second image IMG2-PRI corresponding to the gaze direction of the remote operator O. As a result, the "appearance" as viewed from the remote operator O is improved, and the sense of discomfort felt by the remote operator O is suppressed.

3-4. Fourth Example

The fourth example is a combination of the second example and the third example described above. Combining the second example and the third example described above makes it possible to obtain both the effect in the case of the second example and the effect in the case of the third example.

4. Configuration Example of Vehicle

4-1. Configuration Example

Figure 13:
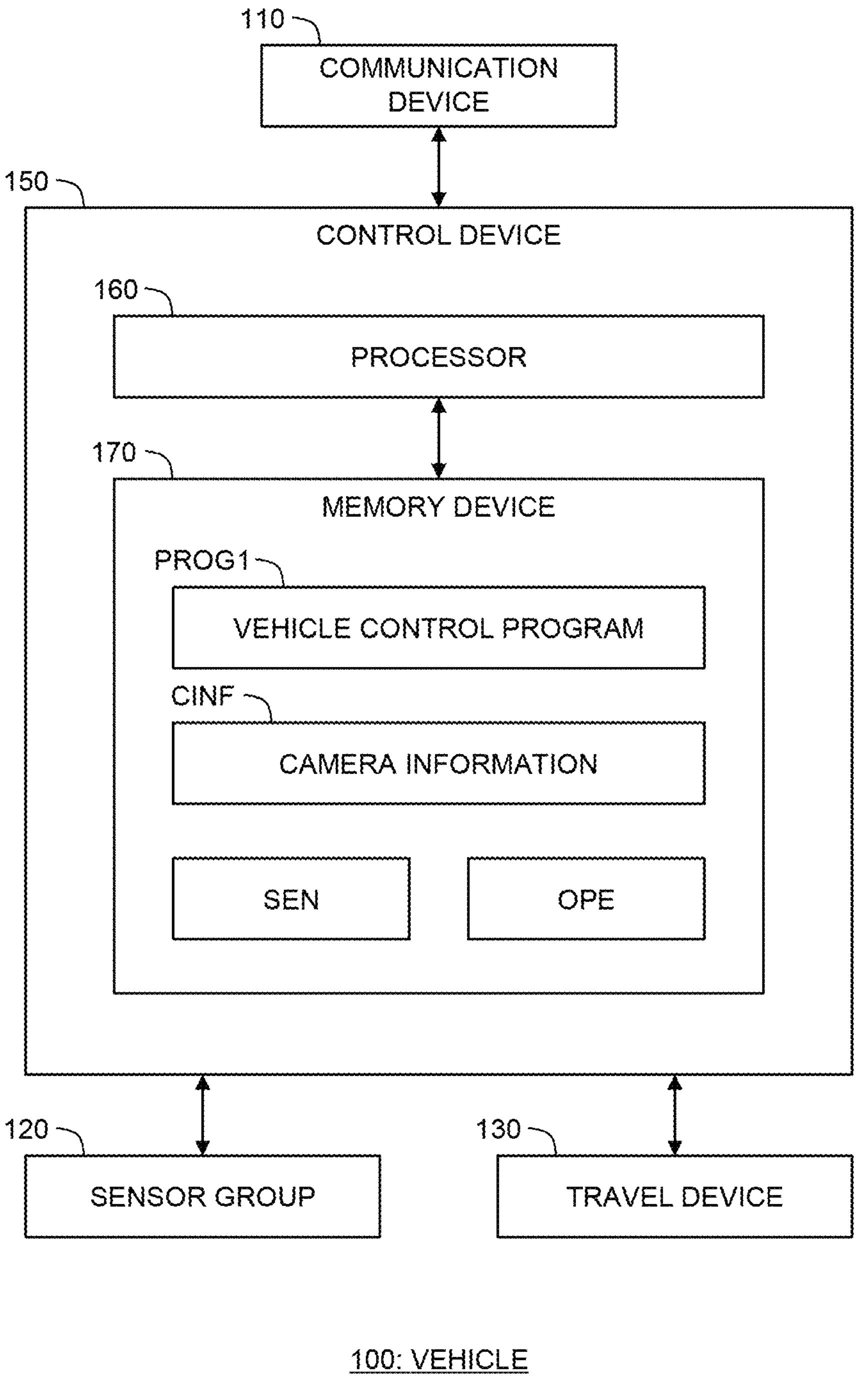
FIG. 13 is a block diagram showing an example of a configuration of a vehicle.

FIG. 13 is a block diagram showing a configuration example of the vehicle 100. The vehicle 100 includes a communication device 110, a sensor group 120, a travel device 130, and a control device 150.

The communication device 110 communicates with the outside of the vehicle 100. For example, the communication device 110 communicates with the remote operator terminal 200 and the management device 300.

The sensor group 120 includes a recognition sensor, a vehicle state sensor, a position sensor, and the like. The recognition sensor recognizes (detects) a situation around the vehicle 100. Examples of the recognition sensor include the camera CAM, a laser imaging detection and ranging (LIDAR), a radar, and the like. The vehicle state sensor detects a state of the vehicle 100. Examples of the vehicle state sensor include a speed sensor, an acceleration sensor, a yaw rate sensor, a steering angle sensor, and the like. The position sensor detects a position and a moving direction of the vehicle 100. For example, the position sensor includes a global navigation satellite system (GNSS) sensor.

The travel device 130 includes a steering device, a driving device, and a braking device. The steering device turns wheels. For example, the steering device includes an electric power steering (EPS) device. The driving device is a power source that generates a driving force. Examples of the drive device include an engine, an electric motor, an in-wheel motor, and the like. The braking device generates a braking force.

The control device 150 is a computer that controls the vehicle 100. The control device 150 includes one or more processors 160 (hereinafter, simply referred to as a processor 160) and one or more memory devices 170 (hereinafter, simply referred to as a memory device 170). The processor 160 executes a variety of processing. Examples of the processor 160 include a general purpose processor, a special purpose processor, a central processing unit (CPU), a graphics processing unit (GPU), an application specific integrated circuit (ASIC), a field-programmable gate array (FPGA), an integrated circuit, and/or a combinations thereof. The memory device 170 stores a variety of information. Examples of the memory device 170 include a volatile memory, a nonvolatile memory, a hard disk drive (HDD), a solid state drive (SSD), and the like. The control device 150 may include one or more electronic control units (ECUs). When generalizing, the control device 150 may also be referred to as "processing circuitry."

A vehicle control program PROG1 is a computer program executed by the processor 160. The functions of the control device 150 may be realized by a cooperation of the processor 160 executing the vehicle control program PROG1 and the memory device 170. The vehicle control program PROG1 is stored in the memory device 170. The vehicle control program PROG1 may be recorded on a non-transitory computer-readable recording medium.

4-2. Sensor Detection Information

The control device 150 acquires the sensor detection information SEN by using the sensor group 120. The sensor detection information SEN is stored in the memory device 170. The sensor detection information SEN includes the image IMG, vehicle state information, position information, object information, and the like. The image IMG is captured by the camera CAM. The vehicle state information indicates the state (for example, a speed, a steering angle, or the like) of the vehicle 100 detected by the vehicle state sensor. The position information indicates the position and the moving direction of the vehicle 100 detected by the position sensor.

The object information is information on an object around the vehicle 100. Examples of the object around the vehicle 100 include a pedestrian, a bicycle, a motor bike, another vehicle (e.g., a preceding vehicle, an adjacent vehicle, a following vehicle, and the like), a white line, a road structure (e.g., a curb, a guardrail), a pole, a traffic light, a sign, and the like. The control device 150 is able to recognize the object around the vehicle 100 by using the recognition sensor. For example, analyzing the image IMG makes it possible to identify an object and to calculate a relative position of the object. As another example, it is also possible to identify an object and acquire a relative position and a relative speed of the object based on point cloud information obtained by the LIDAR. The object information includes the relative position of the object with respect to the vehicle 100. The object information may further include the relative speed of the object.

4-3. Vehicle Travel Control

The control device 150 executes vehicle travel control that controls travel of the vehicle 100. The vehicle travel control includes steering control, driving control, and braking control. The control device 150 executes the vehicle travel control by controlling the travel device 130 (i.e., the steering device, the driving device, and the braking device).

The control device 150 may execute autonomous driving control based on the sensor detection information SEN. More specifically, the control device 150 generates a travel plan of the vehicle 100 based on the sensor detection information SEN. Further, the control device 150 generates a target trajectory required for the vehicle 100 to travel in accordance with the travel plan, based on the sensor detection information SEN. The target trajectory includes a target position and a target velocity. Then, the control device 150 executes the vehicle travel control such that the vehicle 100 follows the target trajectory.

4-4. Processing Related to Remote Operation

When the remote operation of the vehicle 100 is performed, the control device 150 communicates with the remote operator terminal 200 via the communication device 110.

The control device 150 transmits at least a part of the sensor detection information SEN to the remote operator terminal 200. Typically, the control device 150 transmits the image IMG to the remote operator terminal 200. The control device 150 may transmit the vehicle state information to the remote operator terminal 200. The control device 150 may transmit the object information to the remote operator terminal 200.

In addition, the control device 150 receives the remote operation information OPE from the remote operator terminal 200. The remote operation information OPE is information related to the remote operation performed by the remote operator O. For example, the remote operation information OPE includes the operation amount input by the remote operator O. The control device 150 performs the vehicle travel control in accordance with the received remote operation information OPE.

4-5. Camera Information

The camera information CINF includes installation information and performance information of each of one or more cameras CAM mounted on the vehicle 100. The installation information indicates an installation position and an installation direction of the camera CAM in a vehicle coordinate system. The performance information indicates a focal length, an angle of view, and the like of the camera CAM. The camera information CINF is stored in the memory device 170. The control device 150 may transmit the camera information CINF to the remote operator terminal 200.

5. Configuration Example of Remote Operator Terminal

Figure 14:
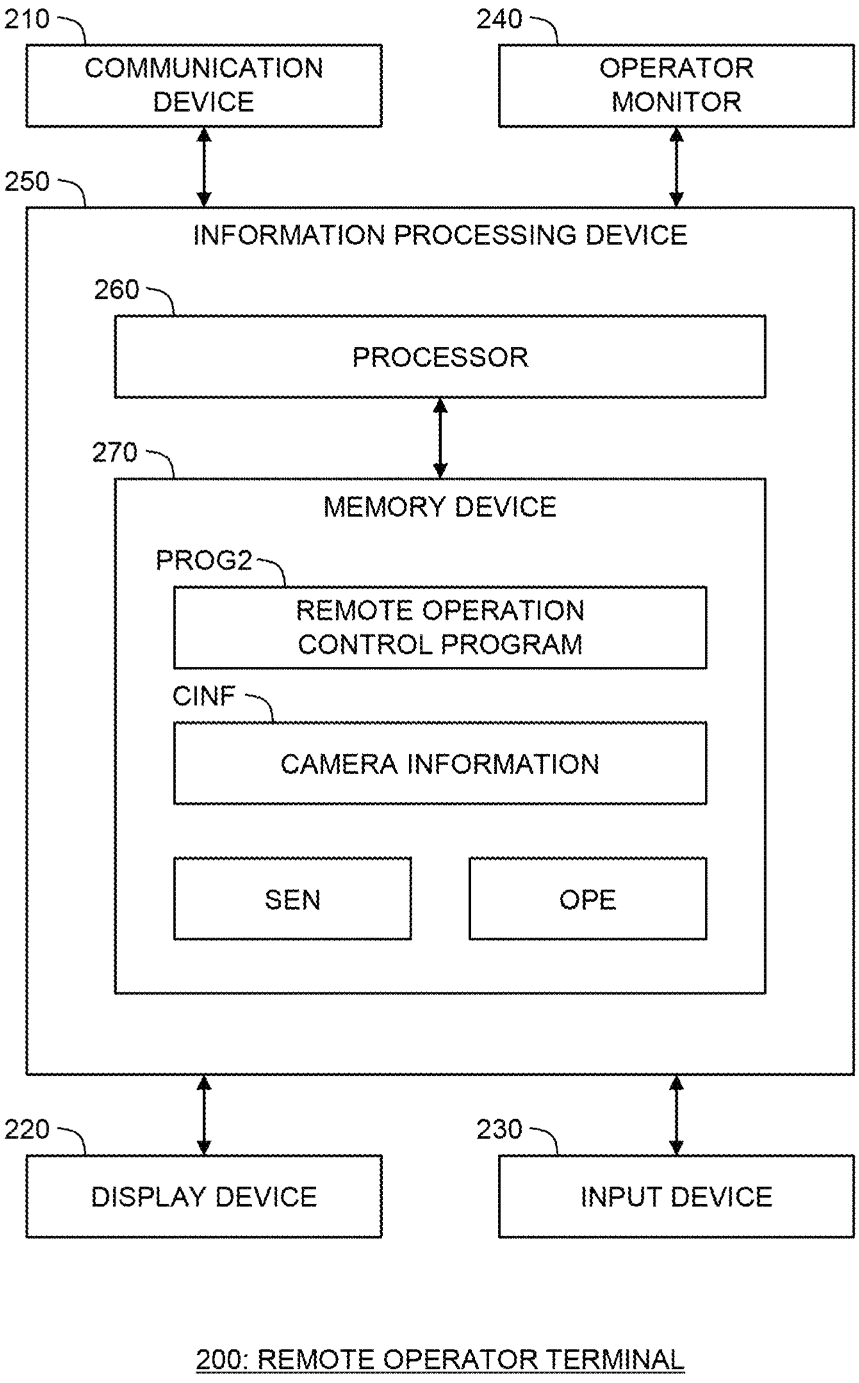
FIG. 14 is a block diagram showing an example of a configuration of a remote operator terminal.

FIG. 14 is a block diagram showing a configuration example of the remote operator terminal 200. The remote operator terminal 200 includes a communication device 210, a display device 220, an input device 230, an operator monitor 240, and an information processing device 250.

The communication device 210 communicates with the vehicle 100 and the management device 300.

The display device 220 displays a variety of information for the remote operator O who performs the remote operation. In other words, the display device 220 presents a variety of information to the remote operator O by displaying the variety of information. The display device 220 includes a plurality of screens 222.

The input device 230 is a member operated by the remote operator O when remotely operating the vehicle 100. For example, the input device 230 includes a remote operation member. The remote operation member includes a steering wheel, an accelerator pedal, a brake pedal, a direction indicator, and the like.

The operator monitor 240 includes a sensor for monitoring a status of the remote operator O. For example, the operator monitor 240 includes a camera that captures an image of a face and eyes of the remote operator O. The operator monitor 240 extracts an image of the face or the eyes of the remote operator O by analyzing the image of the remote operator O captured by the camera. Extracting the images of the face and the eyes is performed by the use of a machine learning model generated in advance through machine learning, for example. Then, the operator monitor 240 recognizes a direction of line of sight of the remote operator O based on a position and a rotation angle of pupil of each eye.

The information processing device 250 controls the remote operator terminal 200. The information processing device 250 includes one or more processors 260 (hereinafter, simply referred to as a processor 260) and one or more memory devices 270 (hereinafter, simply referred to as a memory device 270). The processor 260 executes a variety of processing. Examples of the processor 260 include a general purpose processor, a special purpose processor, a CPU, a GPU, an ASIC, an FPGA, an integrated circuit, and/or a combinations thereof. The memory device 270 stores a variety of information. Examples of the memory device 170 include a volatile memory, a nonvolatile memory, an HDD, an SSD, and the like. When generalizing, the information processing device 250 can also be referred to as "processing circuitry."

A remote operation control program PROG2 is a computer program executed by the processor 260. The functions of the information processing device 250 may be realized by a cooperation of the processor 260 executing the remote operation control program PROG2 and the memory device 270. The remote operation control program PROG2 is stored in the memory device 270. Alternatively, the remote operation program PROG2 may be recorded on a non-transitory computer-readable recording medium. The remote operation program PROG2 may be provided via a network.

The information processing device 250 communicates with the vehicle 100 via the communication device 210. The information processing device 250 receives the sensor detection information SEN transmitted from the vehicle 100. The information processing device 250 presents necessary information included in the received sensor detection information SEN to the remote operator O. For example, the information processing device 250 presents the image IMG to the remote operator O by displaying the image IMG on the display device 220. The remote operator O is able to recognize the state of the vehicle 100 and the surrounding situation based on the presented information.

The remote operator O operates the input device 230. The amount of operation of the input device 230 is detected by a sensor installed in the input device 230. The information processing device 250 generates the remote operation information OPE reflecting the amount of operation of the input device 230 performed by the remote operator O. Then, the information processing device 250 transmits the remote operation information OPE to the vehicle 100 via the communication device 210.

The information processing device 250 may receive the camera information CINF transmitted from vehicle 100. The camera information CINF is stored in the memory device 270.

The information processing device 250 executes the homography process (the delay compensation process) described in the above Section 2 and Section 3. The speed and the steering angle of the vehicle 100 are obtained from the sensor detection information SEN. The steering angle in the steering operation performed by the remote operator O may be regarded as the steering angle of the vehicle 100. The installation information and the performance information of each camera CAM mounted on the vehicle 100 are obtained from the camera information CINF. The gaze direction of the remote operator O can be estimated from the amount of steering operation performed by the remote operator O. The gaze direction of the remote operator O can also be estimated from the direction of line of sight of the remote operator O recognized by the operator monitor 240. Based on the above-described information, the information processing device 250 executes the homography process (the delay compensation process) described in the above Section 2 and Section 3.

What is claimed is:

1. A remote operator terminal used by a remote operator for a remote operation of a moving body, wherein a first image is an image captured at a first timing by a camera mounted on the moving body, a first point of view is defined by a combination of a position and a viewing direction of the camera at the first timing, a second point of view is defined by a combination of a predicted position and a predicted viewing direction of the camera at a second timing later than the first timing, a homography process converts the first image viewed from the first point of view into a second image viewed from the second point of view, and the remote operator terminal comprises processing circuitry configured to:

acquire a plurality of first images respectively captured at the first timing by a plurality of cameras mounted on the moving body;

estimate a gaze direction of the remote operator;

wherein a priority second image corresponds to the gaze direction of the remote operator among the plurality of second images, a magnified second image is the priority second image or a second image displayed adjacent to the priority second image, a magnified first image is a first image before the homography process that serves as a source of the magnified second image in the homography process, an angle of view of each of the plurality of cameras includes a respective central angle of view and a respective peripheral angle of view around the respective central angle of view, a respective central area is an image area corresponding to the respective central angle of view, and a respective peripheral area is an image area corresponding to the respective peripheral angle of view, the processing circuitry is further configured to adjust the plurality of first images before the homography process such that the magnified first image becomes larger than other first images, and adjust the plurality of first images such that the magnified first image includes both the respective central area and the respective peripheral area while each first image other than the magnified first image includes only the respective central area;

acquire a plurality of second images by applying the homography process to the plurality of first images, respectively; and display the plurality of second images side-by-side on a display of the remote operator terminal such that the priority second image appears to be in front of other second images.

2. The remote operator terminal according to claim 1, wherein the processing circuitry is further configured to estimate the gaze direction of the remote operator based on a direction of a line of sight of the remote operator or a steering angle of a steering operation performed by the remote operator.

3. The remote operator terminal according to claim 1, wherein the homography process includes:

estimating a direction and an amount of movement of the moving body in a period from the first timing to the second timing;

calculating a difference between the first point of view and the second point of view based on the direction and the amount of movement of the moving body; and converting the first image viewed from the first point of view into the second image viewed from the second point of view based on the difference between the first point of view and the second point of view.

4. The remote operator terminal according to claim 1, wherein the processing circuitry is further configured to:

set at least a part of a communication delay time between the moving body and the remote operator terminal as a delay compensation time; and set the second timing to be later than the first timing by the delay compensation time.

5. An image display method for displaying an image for a remote operator during a remote operation of a moving body, wherein a first image is an image captured at a first timing by a camera mounted on the moving body, a first point of view is defined by a combination of a position and a viewing direction of the camera at the first timing, a second point of view is defined by a combination of a predicted position and a predicted viewing direction of the camera at a second timing later than the first timing, a homography process converts the first image viewed from the first point of view into a second image viewed from the second point of view, and the image display method comprises:

acquiring a plurality of first images respectively captured at the first timing by a plurality of cameras mounted on the moving body;

estimating a gaze direction of the remote operator;

wherein a priority second image corresponds to the gaze direction of the remote operator among the plurality of second images, a magnified second image is the priority second image or a second image displayed adjacent to the priority second image, a magnified first image is a first image before the homography process that serves as a source of the magnified second image in the homography process, an angle of view of each of the plurality of cameras includes a respective central angle of view and a respective peripheral angle of view around the respective central angle of view, a respective central area is an image area corresponding to the respective central angle of view, and a respective peripheral area is an image area corresponding to the respective peripheral angle of view, the image display method further comprises:

adjusting the plurality of first images before the homography process such that the magnified first image becomes larger than other first images, and adjusting the plurality of first images such that the magnified first image includes both the respective central area and the respective peripheral area while each first image other than the magnified first image includes only the respective central area;

adjusting a plurality of second images by applying the homography process to the plurality of first images, respectively; and displaying the plurality of second images side-by-side on a display of the remote operator terminal such that the priority second image appears to be in front of other second images.

* * * * *